(12) United States Patent
Ferguson

(10) Patent No.: US 8,510,863 B2
(45) Date of Patent: Aug. 20, 2013

(54) IMPACT SHOCK ABSORBING MATERIAL

(76) Inventor: James Riddell Ferguson, Winthrop, ME (US)

(*) Notice: Subject to any disclaimer, the term of this patent is extended or adjusted under 35 U.S.C. 154(b) by 0 days.

(21) Appl. No.: 13/311,875

(22) Filed: Dec. 6, 2011

(65) Prior Publication Data
US 2012/0096630 A1 Apr. 26, 2012

Related U.S. Application Data

(62) Division of application No. 11/939,738, filed on Nov. 14, 2007, now Pat. No. 8,087,101.

(60) Provisional application No. 60/881,227, filed on Jan. 19, 2007.

(51) Int. Cl.
A41D 13/00 (2006.01)

(52) U.S. Cl.
USPC .................................................. 2/69

(58) Field of Classification Search
USPC ............... 2/455, 2.5, 113, 115, 247, 267, 69, 2/94, 108
See application file for complete search history.

(56) References Cited

U.S. PATENT DOCUMENTS

| | | | |
|---|---|---|---|
| 5,090,053 A | 2/1992 | Hayes | |
| 5,317,950 A | 6/1994 | Binon | |
| 5,349,893 A | 9/1994 | Dunn | |
| 5,534,343 A | 7/1996 | Landi | |
| 5,561,866 A | 10/1996 | Ross | |
| 5,599,290 A | 2/1997 | Hayes | |
| 5,830,548 A | 11/1998 | Andersen | |
| 5,878,780 A | 3/1999 | Thomas | |
| 5,918,309 A | 7/1999 | Bachner, Jr. | |
| 6,336,220 B1 | 1/2002 | Sacks | |
| 6,913,802 B1 | 7/2005 | Plant | |
| 7,226,878 B2 | 6/2007 | Wagner | |
| 7,235,291 B2 | 6/2007 | Miyazaki | |
| 7,381,460 B2 | 6/2008 | Palmer | |
| 7,498,276 B2 | 3/2009 | Wagner | |
| 8,248,263 B2 * | 8/2012 | Shervey et al. | 340/686.1 |

FOREIGN PATENT DOCUMENTS

WO 2004103231 A1 12/2004

OTHER PUBLICATIONS

Dow Corning—High Performance Protective Textiles.
Dow Corning—What is Deflexion technology?
Novel Flexible Body Armor Utilizing Shear Thickening Fluid (STF) Composites—14th International Conference on Composite Materials—San Diego, CA—Jul. 14, 2003.

* cited by examiner

Primary Examiner — Tejash Patel
(74) Attorney, Agent, or Firm — Patricia M. Mathers

(57) ABSTRACT

The invention is shock absorbing material to be incorporated into protective gear or clothing. The impact shock absorbing material is a laminated material, having a shear-thickening layer and a shock absorbing layer. The shock absorbing layer is a honeycomb material with cell walls. The shear-thickening layer shunts the local impact forces over a greater area of the underlying shock absorbing layer, thereby reducing the force at the point of impact. The vertical walls of the honeycomb layer buckle under the incoming force, thereby diffusing the direction of force away from direct alignment with the body wearing the impact-shock-absorbing material. Protective gear made of the impact shock absorbing material significantly reduces forces imparted to the body as a result of a fall, blow, or other sudden impact.

8 Claims, 3 Drawing Sheets

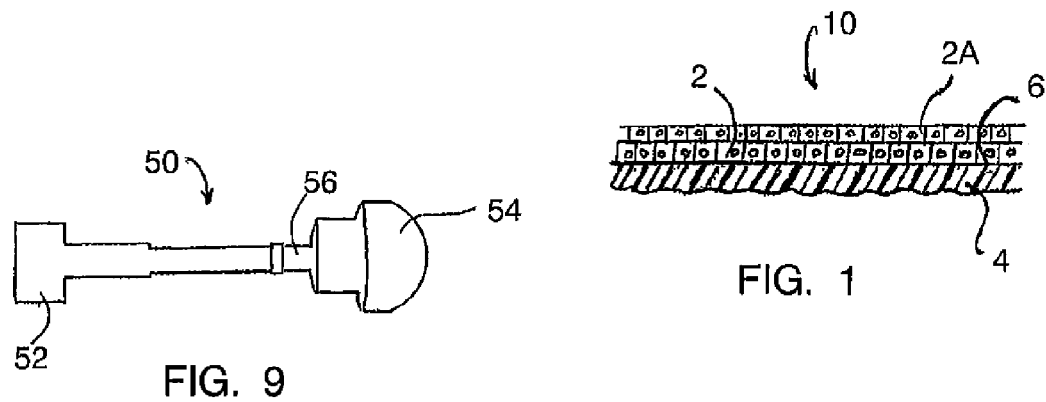
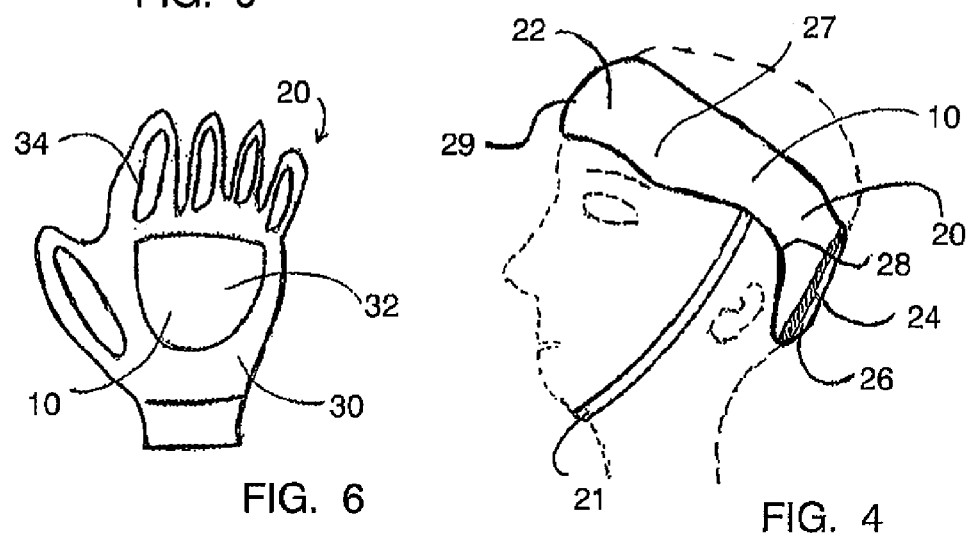
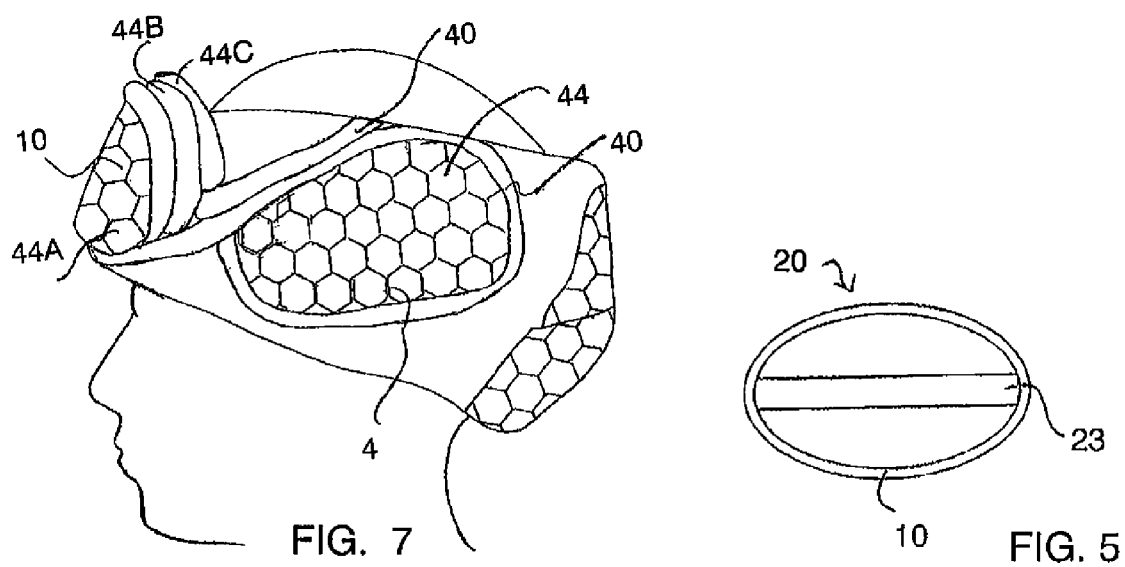

| Trial | Description | Device | On or Off? | Impact Velocity (m/s) | Peak Resultant Deceleration (g) | HIC | % reduction in peak deceleration | % reduction in HIC |
|---|---|---|---|---|---|---|---|---|
| 7 | Knees buckle, sat on feet, and whipped head backwards to ground. | Alba 200 | Unprotected | 7.6904 | 970.738 | 7426 | 63% | 90.5% |
| 12 | Knees locked, fell on butt, and whipped head backwards to ground. | | Protected | 15.6978 | 357.5581 | 708 | | |
FIG. 2A
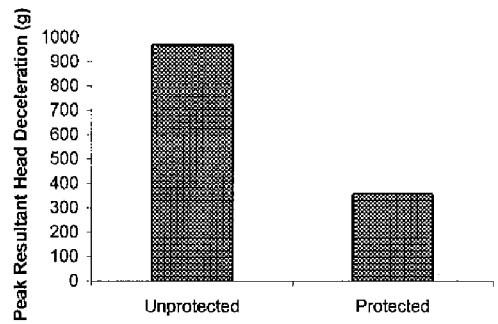
FIG. 2B
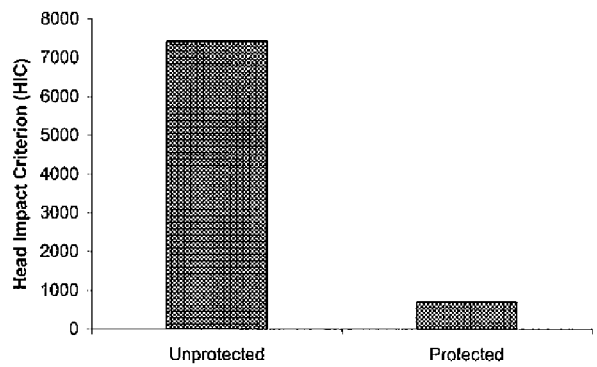
FIG. 2C

| Trial | Description | Device | On or Off? | Impact Velocity (m/s) | Peak Resultant Deceleration (g) | HIC | % reduction in peak deceleration | % reduction in HIC |
|---|---|---|---|---|---|---|---|---|
| 12 | Fall from bed onto VCT where knees hit first, then face and jaw | Alba 200 | Unprotected | 5.3825 | 441.1941 | 1602 | 61.6% | 90.1% |
| 7 | Fall from bed onto VCT where forehead hits first, possibly even above helmet. | | Protected | 1.9753 | 169.2479 | 157 | | |
| 17 | Fall from bed onto VCT on sliding carpet where forehead hits first. Very similar to trial 21. | Alba 800 | Unprotected | 2.0926 | 204.0152 | 230 | 83% | 90.0% |
| 21 | Fall from bed onto VCT on sliding carpet where forehead hits first. Very similar to trial 17. | | Protected | 2.8232 | 34.1018 | 23.5 | | |

FIG. 3A

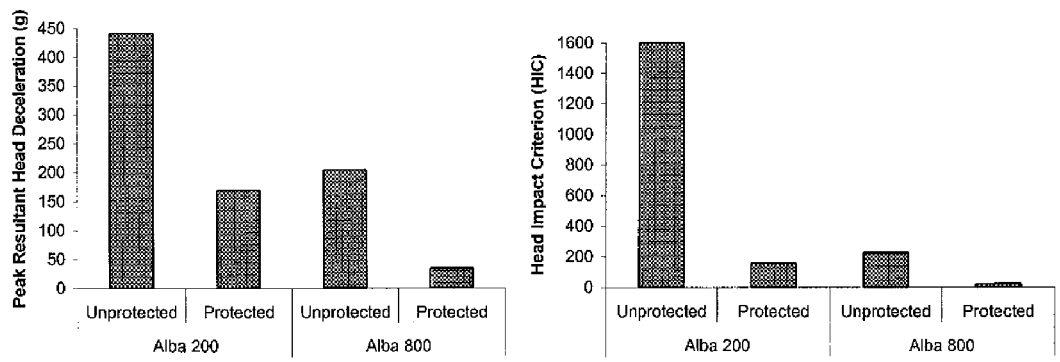

FIG. 3B    FIG. 3C

| TYPE | DROP HEIGHT (in.) | | |
|---|---|---|---|
| | 1.00 | 1.50 | 2.00 |
| | LOAD (lbs) | | |
| DILATANT FOAM - 4.5 mm | 466.64 | 574.49 | 828.59 |
| RIGID HONEYCOMB w/ FABRIC BACKING - 8.5 mm | 154.17 | 347.04 | 623.98 |
| COMBINATION MATERIAL | 116.10 | 170.35 | 257.27 |

FIG. 8

IMPACT SHOCK ABSORBING MATERIAL

BACKGROUND INFORMATION

1. Field of the Invention

The invention relates to the field of shock absorbing material. More particularly, this invention relates to the field of impact-shock absorbing material to be incorporated into articles of clothing or sports gear.

2. Description of the Prior Art

Falls are a common cause of injury to an individual, particularly to the elderly, in which case they are a leading cause of traumatic brain injury and skeletal trauma. Generally, the temple and areas surrounding the greater wing of the sphenoid, the frontal lobes, the temporal-parietal and occipital areas are most vulnerable to serious injury from a fall. A conventional helmet may decrease the chance of serious injury to the head. Helmets, however, generally cover the entire head and are not suitable for long periods of wear or for use while sleeping. Wearing a conventional helmet may also increase the weight of the head, make the head uncomfortably hot, and also cause embarrassment to the wearer or to family members.

Many individuals suffer from disorders or medical conditions that result in loss of balance or falling. For example, individuals who suffer from seizure disorders, advanced multiple sclerosis, cerebral palsy, gait and balance problems, or from conditions that make them weak or dizzy have increased risk of stumbling or falling. Often times, an individual who has suffered a prior head injury, such as a concussion, or undergone brain or cranial surgery requires some head protection during the healing process, because additional trauma can have devastating results. A comfortable, yet fashionable, protective head device would help to reduce the impact of additional injury to the head and aid in the process of healing.

Persons engaged in physical sports activities are also often at risk for bodily injury, be it to the head or to other parts of the body. Concerns often arise particularly with regard to school-age children, who engage in strenuous contact sports, such as soccer, football, hockey, lacrosse, etc. The children are often subject to bodily impact during such activities, as a result of collisions with other participants or with sports equipment or installations, such as balls, bats, hockey sticks or pucks, goal posts, etc.

One major concern is injury to the brain, because these children are still developing physically and may suffer head injuries that have serious or long-lasting negative consequences. Concerns also arise with students who engage in soccer, because of the forces imparted to the head when executing a header or when a player's head collides with another player's head, feet or the ground. Even adult athletes may be subjected to impact shock that results in injury. Conventional protective sports gear is typically heavy, bulky, and rigid. Helmets are required for certain sports, and although they cushion to some extent the impact to the head or other body part from a hockey stick, for example, a certain amount of impact, capable of causing injury, may still be imparted to the head through the helmet.

What is needed, therefore, is an impact-shock-absorbing material that may be incorporated into articles of clothing or sports gear, or as a liner for existing helmets and other sports gear. What is further needed is such impact-shock-absorbing material that is flexible and comfortable to wear. What is yet further needed is protective gear made from such impact-shock-absorbing material that is fashionable, unassuming in appearance, and which may be worn throughout the waking and/or sleeping hours, or during certain activities.

BRIEF SUMMARY OF THE INVENTION

The invention is a layered impact-shock-absorbing material that reduces impact shock by diffusing the shock forces over an area greater than that of the local site of impact. The primary components of the impact-shock-absorbing material are one or more layers of a flexible, anisotropic thermoplastic honeycomb material combined with a shear-thickening or dilatant material. The term "anisotropic" as used herein shall mean a material showing different properties as to compressibility in different directions. The terms "shear-thickening" and "dilatant" are used interchangeably hereinafter to denote a material that is flexible under normal circumstances and becomes rigid rapidly and for a brief period of time, when a sudden impact shock is applied to it. The shear thickening, or dilatant, material is a flexible material that becomes rigid for a brief period of time in response to a sudden impact. This ability to transform from a flexible to a rigid surface effectively shunts the force from the impact over a greater area of the underlying anisotropic honeycomb or other shock absorbing materials, thereby reducing the actual amount of peak force transmitted at any one point. The inventor has discovered through extensive testing, that the most suitable shock absorbing material is a perforated, anisotropic thermoplastic honeycomb material. Anisotropic honeycomb cell walls, which are normally vertical relative to the plane of the sheet of honeycomb material, buckle under compressive forces and deflect to some degree away from their vertical orientation. This deflection serves to diffuse the incoming forces by progressively shunting them out over the various planes of the cell walls. The honeycomb, particularly that with a perforated cell wall, offers a further advantage, in that it is light weight, provides ventilation, and dissipates body heat and moisture. In addition, the ability of an anisotropic honeycomb structure to deflect rotational forces in a manner similar to the human scalp further protects the brain when it is used as a protective head device. Other suitable flexible shock absorbing materials may also be used.

The shear-thickening material is best used as the outer layer over the shock-absorbing material, so that it receives the initial impact force. This configuration is not necessary, however, and the shear-thickening material may be sandwiched between two layers of honeycomb or other shock absorbing material, when a softer outer shell is desired. The ability of the shear-thickening material to become rigid on impact effectively shunts the impact forces over a greater number of underlying honeycomb cells. This diffusion of forces results in a reduction of the peak impact to any single point being protected, and provides for an overall increase in the protective qualities of the shock-absorbing material.

The ability of the outer shear-thickening material to become rigid on impact, diffuses the forces over a greater area of underlying honeycomb or other shock absorbing material. This prevents a "bottoming out" of the shock absorbing material when impact forces are applied to it. As a result, the overall impact-attenuation performance of the layered impact-shock-absorbing material according to the invention is unexpectedly greater than the sum of the individual layers of the composite material. A further advantage of the layered impact-shock-absorbing material is that a thinner, lighter shock-absorbing material may be used.

Ideally, the shock-absorbing material is a perforated honeycomb material. The perforations not only facilitate the deflection of the honeycomb walls under compressive force, but also facilitate the dissipation of body heat and moisture. For reasons of comfort or hygiene, other materials may be used as an inner lining, placed next to the skin. For example, a commercially available moisture-wicking material, such as COOLMAX®, manufactured by DuPont, may be used as a lining, to help reduce the buildup of heat and moisture under the layered impact-shock-absorbing material.

The two components, the underlying shock absorbing material and the outer shear thickening material, together provide the greatest impact-shock-absorbing effect when they are held in intimate contact with each other. It is not necessary that the two components be bonded to each other, although the shock-absorbing result is most effective when the two components are laminated in a way that minimizes slippage. The inventor has determined that the most effective laminate of the layered impact-shock-absorbing material according to the invention is achieved by applying an adhesive to at least one surface of one of the two components that face each other, to bond the two layers directly to each other, thereby forming a laminate structure with little or no slippage between the two layers. A desired characteristic of the adhesive is that it remain flexible when cured, in order to maintain the flexibility of the laminate material, which ideally conforms to the contours and movements of the body it is worn against. A suitable adhesive for this purpose is a cyano-acrylate adhesive commonly sold under the name of "SUPER GLUE", although favorable results may be attained with other adhesives, such as that manufactured by the Bemis company, such as a heat-transfer adhesive film, for example SEWFREE® 3410-4. These two forms of adhesive are particularly effective when using the shear thickening material commonly sold as d3o® by Design Blue Lab. of Hove, England, although it is understood that any adhesive that bonds the layers together and yet retains flexibility may be used. In some applications, the nature of the outer shear thickening material is such that it is very difficult to create an effective bond using adhesives. An example of this is shear thickening material manufactured by Dow Corning and sold under the trade name of "ACTIVE PROTECTION SYSTEM®". In this case the bond may be created by stitching or otherwise mechanically fastening the materials together. The two layers may also be constrained to remain in a congruent orientation, relative one another, by placing them in pockets or between sheets of another material, that is then bonded together at the edges. An additional outer layer of ballistic woven fibers, such as KEVLAR® from DuPont, with or without additional shear thickening fluid imbedded in the fibers, or a sheet of carbon nano-tube-based material may be incorporated into the layered impact-shock-absorbing material, to provide protection against penetration by sharp object, while still retaining the flexible nature of the device.

The impact-shock-absorbing material according to the invention is lightweight and flexible and easily embedded or incorporated into clothing articles or sportswear. This eliminates the need to put on bulky and/or uncomfortable gear, yet provides the desired shock protection. Uses for the impact-shock-absorbing material according to the invention are myriad. One application is as a shock-absorbing material that is incorporated into sports gear, such as a catcher's or a goalie's mitt, knee pads, elbow pads, shin pads, headbands for soccer players, shoulder pads, etc.

Another use is to incorporate the layered impact-shock-absorbing material into protective gear for the elderly, handicapped, or injured, to protect against foreseeable injuries. Examples of such use include headbands to protect against head injuries resulting from falls, or articles of clothing having strips, patches, or sheets of the impact-shock-absorbing material incorporated into them to protect certain parts of the body, such as the hips, particularly the Greater Trochanter, the ribs, or other bones that are prone to fractures. The protective gear may be equipped with a radio frequency identification (RFID) tag for the purpose of tracking the movements of the wearer. For example, elderly and frail patients often sustain head and neck injuries by falling while getting out of bed. Thus, it is often desirable to monitor the movements a person who is supposed to remain in bed. An article of clothing with an RFID tag incorporated into it, such as a headband, allows care professionals to monitor the whereabouts of a patient.

It may also be desirable to monitor whether a patient is actually wearing protective gear. For example, safety concerns and prudence may require that a patient with a history of falling or bumping into hindrances wear protective gear. The patient, however, may have a tendency to remove the protective gear against instructions. A heat sensor may be incorporated into the protective gear so that, when the temperature falls below a certain threshold, a signal alerts the care professional to the fact that the patient has removed the protective gear.

The impact-shock-absorbing material according to the invention is ideally enclosed in a fabric that is best suited for the intended purpose of the protective gear. If the protective gear is a pad or band worn on the body, the fabric may be a moisture wicking fabric, or a natural fiber fabric that is comfortable to wear against the body, such as cotton. If the protective gear is sports gear that is worn on top of clothing or as a mitt, the outer layer may be leather, canvas, or some other heavy-duty, rugged fabric such as ballistic nylon.

BRIEF DESCRIPTION OF THE DRAWINGS

The present invention is described with reference to the accompanying drawings. In the drawings, like reference numbers indicate identical or functionally similar elements. The drawings are not necessarily drawn to scale.

FIG. 1 is a side view of the impact-shock-absorbing material according to the invention.

FIG. 2A is a chart displaying the results of trials 7 and 12, in which a test dummy was dropped from a standing position to the floor.

FIG. 2B is a graph of the peak resultant head deceleration (g) forces imparted to the head of the dummy during the trials described in FIG. 2A.

FIG. 2C is a graph of the head injury criterion (HIC15) resulting from the falls described in FIG. 2A.

FIG. 3A is a chart displaying the results of trials 12, 7, 17, and 21, in which a test dummy was rolled from a prone position on a bed to the floor.

FIG. 3B is a graph of the peak resultant head deceleration (g) forces imparted to the head of the dummy during the trials described in FIG. 3A.

FIG. 3C is a graph of the HIC resulting from the falls described in FIG. 3A.

FIG. 4 is an illustration of a headband, which incorporates the impact-shock-absorbing material of FIG. 1

FIG. 5 is a top view of the headband with a parietal strap.

FIG. 6 is an illustration of a glove, showing that certain portions of the glove are lined with the impact-shock-absorbing material of FIG. 1.

FIG. 7 is an illustration of protective gear constructed of flexibly linked pads of the impact-shock-absorbing material of FIG. 1.

FIG. 8 is a chart displaying the results of impact tests conducted on protective gear made of dilatant foam, or honeycomb material, or a combination of the two materials.

FIG. 9 is an illustration of the impact testing device used to test the force attenuating properties of the material of FIG. 8.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIG. 1 is a side elevational view of a layered impact-shock-absorbing material 10 according to the invention, showing a laminated material comprising a first layer 2, and second layer 4. The first layer 2 is a shock absorbing material. The second layer 4 is a sheet of shear-thickening or dilatant material. Ideally, the first or shock absorbing layer 2 serves as an inner layer and the second layer 4 as an outer layer, relative to a wearer's body, so that the inner layer is between the outer layer and the body to be protected. The shear-thickening or second layer 4 serves to shunt impact forces exerted by an external object over a greater surface area, thereby reducing the local forces that are passed on to the shock absorbing layer 2.

FIG. 1 also shows an adhesive 6 applied between the first layer 2 and the second layer 4, to reduce slippage between the two layers. The use of the adhesive 6 enhances the shock-absorbing capability of the impact-shock-absorbing material 10, but is not a required element of the impact-shock-absorbing material 10 according to the invention. Even without the adhesive 6, the impact-shock-absorbing material 10 will provide effective shock-absorbing capability. The adhesive 6 may be applied as a sheet material, as a strip of adhesive applied around the outer perimeter of the material, or spot-applied randomly, to minimize the amount of adhesive used, yet provide the desired non-slippage effect between the first and second layers 2 and 4. An example of a suitable adhesive is a cyanoacrylate adhesive, such as SUPER GLUE or KRAZY GLUE. A desirable characteristic of the adhesive 6 is that it retain flexibility after curing, so that the layered impact-shock-absorbing material 10 remains flexible and able to conform readily to the shape and movements of the wearer's body. If it is not practicable to apply the adhesive 6, other means of constraining the first and second layers 2, 4, respectively, so that the areal surface of one layer is held over the adjacent areal surface of the other layer, with a minimum of slippage. For example, the first and second layers 2 and 4 may be constrained with a pocket, that prevents them from slipping or may be placed between two other sheets of fabric, which are then stitched together in close proximity to the perimeter of the first and second layers 2 and 4, so that one layer is constrained from slipping relative to the other layer.

In the embodiment shown, a honeycomb material, and preferably, a thermoplastic perforated honeycomb material, possessing anisotropic qualities, is used as the shock absorbing layer 2. The perforated honeycomb material may be made with a thermoplastic urethane (TPU) material. It is understood, however, that the shock-absorbing layer 2 may be constructed of any material having shock absorbing properties, such as Expanded Vinyl Acetate (EVA). An example of a suitable thermoplastic honeycomb material is one that is commercially available from Supracor, Inc. of San Jose, Calif., and sold under the tradename STIMULITE®, although other shock absorbing honeycombs, foams or gels may be used. This honeycomb material is particularly well suited to be incorporated into clothing or gear that is worn on the body, because it is very flexible, due in part to a perforation in each vertical honeycomb cell wall. The perforations allow the honeycomb to buckle, i.e., the vertical walls deflect away from their vertical orientation. The perforated honeycomb material also serves the important function of providing ventilation and diffusing heat and moisture. Examples of a suitable shear-thickening or dilatant material for the second layer 4 include commercially available material sold under the tradename d3o® by Design Blue, Ltd., of Hove, England, and under the tradename ACTIVE PROTECTIVE SYSTEM® sold by the Dow Corning Corporation. These materials are available in various thicknesses and in various embodiments, and are selected for a particular embodiment of the layered impact-shock-absorbing material 10, depending on the intended use and purpose.

These examples of suitable materials are given to provide a complete disclosure of the components of the impact-shock-absorbing material 10, but it is understood that other materials with suitable shear-thickening properties or anisotropic properties may be used. Although only one layer of the impact-shock-absorbing material 10 is shown in FIG. 1, additional layers of the shear-thickening layer 4 or the anisotropic layer 2 may be layered together to further enhance the shock-absorbing performance of the material 10. An additional layer may have a different durometer rating, in other words, may be harder or softer, depending on what part of the body the impact-shock-absorbing material 10 is protecting. A particularly comfortable embodiment of the impact-shock-absorbing material 10 includes the anisotropic layer 2 and an additional anisotropic layer 2A. In order to provide maximum protection to sensitive areas of the body, different thicknesses of anisotropic honeycomb or other shock absorbent material and shear thickening materials may be used, while still retaining overall flexibility and comfortable fit. For example, when someone falls directly backwards, it is essential that the occipital area of the skull be protected from forces that can exceed 1000 Gs. Thus, a thicker configuration offering greater impact attenuation is appropriately selected. The same applies to the area of the temple and sphenoid areas where the bone is much thinner and encases underlying structures such as the middle meningeal artery.

FIGS. 2A-3C show the results of several impact tests performed on a hybrid 111 anthropomorphic dummy. An anthropomorphic dummy is a full-scale replica of a human, designed to simulate the behavior of a human body, and is typically used in the motor vehicle industry for testing of motor vehicles for compliance with motor vehicle safety standards. The hybrid 3 dummy weighs approximately 220 pounds and is representative of an American male in the $50^{th}$ percentile. In the test conducted, the dummy was subjected to two types of falls, either dropped from a standing position onto the floor, or rolled out of a bed from a prone position onto the floor. The floor was a vinyl covered tile floor, which is similar to the types of floors used in nursing homes and other facilities. Similar type falls were performed with the dummy, some with the head of the dummy protected and some with it unprotected, so as to obtain data from falls that were comparable in the injury that would likely result in a human. "Protected" means the dummy was wearing a headband made of the impact-shock-absorbing material 10; "unprotected" means the head of the dummy carried no protection. Two different headbands were used in the tests: one designated Alba 200 and another one designated Alba 800. Both Alba headbands incorporated the same impact-shock-absorbing material 10, with regard to type of material of the first and second layers 2 and 4. The difference between the two headbands is that the Alba 800 utilized a slightly thicker form of material and covered a greater surface area of the head than the Alba 200.

Brain injuries generally occur from either an impact to the brain or from a sudden, abrupt head movement. The dummy's head was equipped with tri-axial accelerometers, which measured the acceleration of the head in multiple directions. These acceleration measurements were used to calculate the head injury criterion (HIC) and the peak resultant head deceleration (PRHD) forces exerted on the head during a fall. The PRHD is a measurement of the g forces exerted on the head. HIC is a dimensionless number that is calculated from deceleration over a critical time period of extremely rapid deceleration. HIC is a well known indicator in the automobile industry for evaluation of the effects of blunt trauma on the head in a motor vehicle accident. Although not necessarily a direct indicator of the likelihood of brain injury, it is generally accepted that an impact to the head resulting in an HIC value above 1000 will result in a head injury that is life threatening. Reducing the magnitude of the HIC will, therefore, result in fewer and less serious head injuries.

FIGS. 2A-2C show the results of two trials, in which the dummy was subjected to "standing falls", that is, fell directly to the ground from a standing position. Standing falls often result in a fatal or near fatal fall, particularly for the elderly. Before the dummy was subjected to a fall, it's head was either protected with a headband comprising the impact-shock-absorbing material 10, or unprotected. The peak resultant head deceleration (PRHD) forces that were measured are shown in bar graph form in FIG. 2B and the corresponding HIC values are shown in bar graph form in FIG. 2C. In Trial 7, described in FIG. 2A, the dummy's head was unprotected. As the dummy fell to the ground, its knees buckled, it sat onto its feet, and its head whipped backwards before striking the ground. The PRHD on the head measured 970.738 g upon impact. The HIC was calculated to be 7426. A fall measuring PRHD close to 1,000 g and an HIC greater than seven times the threshold HIC value for a life-threatening brain injury would very likely result in death in a human. In Trial 12, the dummy's skull was protected with a headband comprising the impact-shock-absorbing material 10. In this trial, the impact-shock-absorbing material was Alba 200. As it fell to the ground, the dummy's knees locked, it landed on its behind, and its head whipped backwards to the ground. The PRHD on the head measured 357.5581 g and the HIC was calculated to be 708. A comparison of the bars in FIG. 2B shows an extreme reduction in deceleration forces imparted to the skull when the head of the dummy was protected with a headband that incorporated the impact-shock-absorbing material 10 according to the invention. The actual measured reduction in PRHD was 63%. Similarly, a comparison of the bars in FIG. 2C shows an extreme reduction in HIC values. This extreme reduction was unexpected and was due to the interaction of the dynamic shock absorbing nature of the impact-shock-absorbing material 10. The results of the standing fall tests clearly show that using impact-shock-absorbing protective gear, such as the Alba 200, reduces the impact forces on the head to levels that are well below the critical HIC threshold of 1000. In fact, the reduction in HIC was calculated to be 90.5%, reducing the potential injury from a fatal fall to a very survivable one.

FIGS. 3A-3C show the results of four trials, trial numbers 12, 7, 17, and 21. In each fall, the dummy was subjected to a "bed fall", that is, the dummy rolled from a prone position out of a bed onto the floor. A carpet, such as is typically used in a bedroom, was originally placed on the floor next to the bed, however, since it had no effect on lessening the impact of the fall, an uncarpeted vinyl covered tile floor was used instead. In two of the falls, Trials 7 and 21, the head of the dummy was protected with a headband comprising the impact-shock-absorbing material 10. In two of the falls, Trials 12 and 17, the head of the dummy was unprotected. Trials 12 and 7 represent a first set of comparable falls and trials 17 and 21 a second set of comparable falls.

During the fall in Trial 12, the dummy hit the floor first with its knees and then with its face and jaw. The measured PRHD was extremely high, 441.1941 g, as shown in FIG. 3B. FIG. 3C shows the HIC calculated for this fall as being 1602, well above the threshold value of 1000. In Trial 7, as shown in FIG. 3A, the head of the dummy was protected with a headband designated Alba 200. In this fall, the head of the dummy struck the floor first. The measured PRHD was 169.2479 g, a 61.6% reduction in PRHD imparted to the head, compared to the fall of Trial 12. The HIC was calculated to be a mere 157, an 90.1% reduction in the potential for brain injury. FIGS. 3B and 3C illustrate in bar graph form the reduction in PRHD and HIC imparted to the head of the dummy, showing that the potential for brain injury is greatly reduced when wearing the Alba 200.

In trials 17 and 21, the dummy again rolled from a prone position in a bed to the floor. In Trial 17, the head of the dummy remain unprotected. The forehead of the dummy hit the floor first. The impact on its head measured 204.0152 g. In Trial 21, the dummy was protected with the headband designated Alba 800 and suffered a fall very similar to that of Trial 17. The deceleration forces of this protected fall, however, measured nowhere near those of Trial 17. In Trial 21, the PRHD was only 34.1018 g. Since 78 g is considered to be the level of force that initiates a concussion, it is desirable that deceleration or shock forces to the head be kept at or below this level. In this case, wearing the Alba 800 reduced the deceleration forces to the head to such an extent that it is unlikely that a person suffering this amount of force would suffer a concussion or a more serious head injury. A comparison of the results of Trial 17 and Trial 21, as shown in FIG. 3B, illustrates that the deceleration forces are greatly reduced when the head is protected with the impact-shock-absorbing material 10. The protection is particularly effective when a large surface area of the head is covered with the impact-shock-absorbing material 10. The HIC for Trial 21 was calculated to be 23.5, compared to the HIC of 230 for Trial 17, a reduction of 89.8%. FIGS. 3B and 3C show clearly that wearing either the Alba 200 or the Alba 800 greatly reduces the deceleration forces imparted to the head in a fall and, thus, reduces the overall potential for a serious head injury. Further, the potential for a concussive brain injury becomes very unlikely, when wearing the impact-shock-absorbing material 10 that covers a large portion of the head, such as the Alba 800 embodiment.

FIG. 8 is a chart that shows the results of tests that were conducted to examine the force attenuating properties of various embodiments of shock-absorbing materials. The inventor discovered through these tests, that the impact-shock-absorbing material 10 according to the invention, that is, the layered combination of the shear-thickening layer 4 and the anisotropic layer 2, provided shock-absorption capabilities that surpassed a mere summation of the shock absorption capabilities provided individually by the shear thickening and the anisotropic materials. Originally, the tests included several other types of materials typically used in protective helmets to determine which of the materials, either independently or in combination, would attenuate the most force from an applied load. These particular tests were conducted using an INSTRON DYNATUP 9250 HV vertical impact-testing machine. In each test, a weighted crosshead was raised from a desired height and then released to drop in free fall until it hit the floor. An impact testing device 50, shown in FIG. 9, was used to test the force attenuating properties of the test materials. One end of the impact testing device 50 was connected to the weighted crosshead at an attachment point 52. The other end of the impact testing device 50 was an anatomically shaped impact striker 54 made from solid aluminum, having dimensions that correspond to various parts of a human head. A 1000 lb piezoelectric load cell 56, known for providing excellent accuracy over a testing range, was located directly behind the impact striker 54. In each test, the weighted crosshead was dropped so that the striker 54 struck a concrete block lined with a linoleum tile overlay, a material that is commonly used in hospital flooring. The load cell 56 measured the load that passed was through the test material onto the impact striker. Each of the materials listed in FIG. 8 was tested using three sets of parameters: a 14 lb drop weight was dropped from three different heights: 1 in, 1.5 in and 2 in. FIG. 8 shows that each material, either alone or in combination, passed greater force through to the impact striker as the drop height increased. As a single protective material, the shear-thickening material 4 alone provided little protection, allowing impact forces ranging from 466 to 828 lbs to reach the skull. The anisotropic material 2 used alone provided more protection, yet still allowed 623 lbs of force to reach the skull when dropped 2 inches. When sheets of these two materials were combined to form the impact-shock-absorbing material 10, the force reaching the impact striker was reduced to a range of 116 to 257 pounds. Thus, the combination of materials in the impact-shock absorbing material 10 according to the invention provided a level of protection that was unexpected and that surpassed the amount of protection to be expected from simply summing the attenuation provided by each individual material. When the honeycomb or anisotropic layer bottoms out, most of the impact forces are passed through the material without significant attenuation. This is one reason why an impact-shock absorbing layer comprising honeycomb material alone provides significantly less protection, than when combined with the shear-thickening layer.

The combination of shear-thickening layer 4 and honeycomb layer 2 in the impact-shock-absorbing material 10 provides levels of shock absorption approaching or exceeding that of a hard-shelled helmet, yet the impact-shock-absorbing material 10 remains flexible when not under impact shock. Different thicknesses of the impact-shock-absorbing material 10 may be used. For example, impact-shock-absorbing material 10 with multiple layers may be used to protect an extremely sensitive area of the skull while only one layer of the material may be used to protect an area that requires greater flexibility, but is also less sensitive to injury, such as an arm or a leg. Each layer may have the same or different durometer ratings, or the same thickness or different thicknesses, depending on which area of the body is being protected. Ideally, the additional honeycomb layer 2A will be selected to buckle more readily than the first honeycomb layer 2. In the embodiment shown in FIG. 1, the additional honeycomb layer 2A has a lower durometer rating than that of the honeycomb layer 2. Because the additional shock-absorbing layer 2A buckles faster than the first shock-absorbing layer 2, it will begin absorbing some of the impact before the first shock-absorbing layer 2 begins to absorb impact. This has the effect of increasing the time over which the impact is transferred through to the body. This progressive deformation of the honeycomb cell walls, results in a reduction in rate of collapse and reduced peak impact forces. It is desirable to reduce the peak impact forces while also increasing the time to transfer the forces to the body, because this reduces damage to underlying body tissue, and is perceived by the person as less jarring and, thus, less uncomfortable, than a more rapid application of force. The two layers 2 and 2A are preferably bonded together, using a fusion bonded method that is commonly known to those skilled in the art.

FIG. 4 is an illustration of a protective gear 20 comprising the impact shock absorbing material 10. The impact-shock-absorbing material 10 is encased in a shell 22 of some soft, flexible material that is comfortable against the skin. In the embodiment shown, the protective gear 20 is a headband with three wider sections, the occipital portion 26, the temporal portion 27 and the frontal portion 29. The bones of these three areas are particularly sensitive to injury. as is the underlying brain tissue. The occipital bone, located at the back of the skull, is particularly prone to injury from an impact of a fall, so the occipital portion 26 of the protective gear 20 extends farther down the back of the head towards the neck, to protect this large area. The temporal portion 27 and the frontal portion 29 are also wider to afford protection to those particular regions that are often injured in a fall. The headband 20 in the embodiment shown is constructed so as not to impede the wearer's vision. A tapered region 28 that extends above the ear between the occipital portion 26 and temporal portion 27 ensures that the headband 20 does not impede the wearer when putting on or removing eyeglasses. The headband 20 may have areas with different thicknesses, offering more protection in some areas than others. For example, additional layers or thicker layers of the impact-shock-absorbing material 10 may be provided at the frontal portion 29 and the occipital portion 26 of the headband 20, because these are the areas most likely to be injured in a fall. The protective gear 20 may have a fabric touch fasteners 24, or some type of elastic material, so that it is adjustable to various head sizes. A chinstrap 21 may be used to secure the protective gear 20 against inadvertent removal.

FIG. 5 illustrates a second embodiment of the protective gear 20, which has a parietal strap 23 for protecting the parietal region. The parietal region is the area least likely to be injured as a result of a fall, but in some cases it would be desirable to have a parietal strap 23 for added protection, such as when a patient is recovering from a brain injury or brain surgery, or confined to bed and subject to a head first drop. Ideally, the parietal strap 23 is made of a stretchable material, such as cotton knit, to account for various head sizes. The thickness of the impact-shock-absorbing material 10 may be thin, since this area is less likely to be injured during a fall. The chinstrap 21 and the parietal strap 23 may have fabric touch fasteners, or any other suitable fastening means for easy attachment to and removal from the headband 20.

FIG. 6 is an illustration a third embodiment of the protective gear 20, a catcher's mitt 30, which has a palm section 32 and finger sections 34. These palm and finger section 32, 34 are padded with the impact-shock-absorbing material 10. The catcher's mitt 30 may be made of the conventional leather and look from the outside to be quite conventional. The palm section 32 and the finger sections 34 provide the mitt 30 with exceptional shock-absorbing capability. It is understood that the catcher's mitt 30 is provided as an illustration only of the use of the impact-shock-absorbing material 10 in body-protective sports gear, and that the material 10 is suitable for use in myriad types of protective pads and mitts, such as knee pads, shoulder pads, goalie's mitts, helmets, etc.

FIG. 7 illustrates a fourth embodiment of the protective gear 20. The impact-shock-absorbing material 10 is edged with a flexible edging 40, such as a piping, tubing, or other thin, flexible material, to form a pad 44. Two or more pads 44 may be stitched together or otherwise connected to each other at the flexible edging 40. The purpose of constructing the protective gear 20 from a plurality of pads 44 connected to each other with the flexible edging 40 is to increase the flexibility of the protective gear 20 while still providing adequate protection around the entire skull. Ideally and reasonably, the pads 44 are sized and attached to each other, such, that the flexible edging 40 does not diminish protection against impact shock in a critical area. The pads 44 may be covered with a mesh covering or other breathable fabric. The pads 44 may also include one layer of the impact-shock-absorbing material 10 or more, depending on which part of the skull is being protected. For example, an area of the skull more likely to be injured during a fall, such as the occipital region, may best be protected with multiple pads 44, simply placed one over the other, as represented by 44A-44C. The pad 44 may be any shape or size suitable for the particular area to be protected.

The impact-shock-absorbing material 10 according to the invention may also be combined with other materials. For example, an outer layer of material offering ballistic penetration resistance may be added, to provide protection against projectiles that are associated with various weapons. Examples of such material include fabric woven of high-strength polymeric fibers, such as the fabric marketed by DuPont under the tradename KEVLAR®, a fabric made of carbon nano-tubes, fabricated in such a manner to form protective sheets, a KEVLAR® fabric impregnated with a dilatant material placed over the honeycomb, or a layer of conventional foam together with a layer of shear-thickening material.

It is understood that the embodiments described herein are merely illustrative of the present invention. Variations in the construction of the impact-shock-absorbing material may be contemplated by one skilled in the art without limiting the intended scope of the invention herein disclosed and as defined by the following claims.

What is claimed is:

1. Protective gear comprising:
   a protective device: and
   an impact-shock-absorbing material that includes a first layer of shock absorbing material that is a honeycomb material with honeycomb cell walls placed over a second layer of material having a shear-thickening property;
   wherein a first surface of said first layer and a first surface of said second layer are held in close contact to each other; and
   wherein said impact-shock-absorbing material is incorporated into said protective device.

2. The protective gear of claim 1 further comprising an outer shell that encases said impact-shock-absorbing material.

3. The protective gear of claim 1, wherein protective device is a headband.

4. The protective gear of claim 1, wherein said protective device is sports gear.

5. The protective gear of claim 1, wherein protective device is a helmet and said impact absorbing material is incorporated into a liner for said helmet.

6. The protective gear of claim 1, wherein the protective device contains a radio frequency identification tag to allow for notification of wearer's location.

7. The protective gear of claim 1, wherein said protective device includes a temperature sensitive radio transmitter that annunciates when said protective device has been removed from a wearer.

8. The protective gear of claim 1, wherein the honeycomb cell walls are perforated.

\* \* \* \* \*